(12) United States Patent
Nanbu et al.

(10) Patent No.: US 7,270,482 B2
(45) Date of Patent: Sep. 18, 2007

(54) SLIDING DEVICE

(75) Inventors: Toshikazu Nanbu, Tokyo (JP);
Yoshiteru Yasuda, Yokohama (JP);
Yousuke Koiduka, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 111 days.

(21) Appl. No.: 11/044,047

(22) Filed: Jan. 28, 2005

(65) Prior Publication Data

US 2005/0175263 A1    Aug. 11, 2005

(30) Foreign Application Priority Data

Feb. 5, 2004  (JP) .............................. 2004-029829
Mar. 5, 2004  (JP) .............................. 2004-062918
Dec. 6, 2004  (JP) .............................. 2004-352651

(51) Int. Cl.
*F16C 33/10*    (2006.01)
*F02B 75/04*    (2006.01)

(52) U.S. Cl. ..................... 384/284; 123/78 E; 384/13

(58) Field of Classification Search ................ 384/12, 384/13, 115, 283–294; 123/78 E
See application file for complete search history.

(56) References Cited

U.S. PATENT DOCUMENTS

| 1,377,866 | A | * | 5/1921 | White ..................... 384/291 |
| 2,673,767 | A | * | 3/1954 | Schoeppner ............... 384/291 |
| 6,095,690 | A | * | 8/2000 | Niegel et al. ............. 384/293 |
| 6,565,258 | B1 | * | 5/2003 | Yamada et al. ............ 384/276 |
| 6,691,655 | B2 | * | 2/2004 | Aoyama et al. .......... 123/90.16 |
| 6,736,101 | B2 | | 5/2004 | Kano et al. |
| 2002/0090155 | A1 | * | 7/2002 | Ushijima et al. ............ 384/293 |

FOREIGN PATENT DOCUMENTS

JP     2002-235852 A    8/2002

* cited by examiner

*Primary Examiner*—Thomas R. Hannon
(74) *Attorney, Agent, or Firm*—Foley & Lardner LLP

(57) ABSTRACT

A sliding device is comprised of a first sliding member which is rotatable on an axis of the first sliding member, a second sliding member which slidably supports the first member through viscous fluid and at least a pit which is formed on a surface of at least one of the first and second sliding members so as to promote a viscous fluid flow, which has a component of a rotational direction of the shaft when the first member is rotated.

30 Claims, 12 Drawing Sheets

TEST MACHINE

BLASTING

MRF

INDENTATION

SLIDING DEVICE

BACKGROUND OF THE INVENTION

The present invention relates sliding members which slide with each other through viscous fluid, and more particularly to a sliding device comprised of a rotating shaft and a bearing for supporting the shaft.

U.S. Pat. No. 6,736,101 discloses a reciprocating engine part whose sliding surface has microscopic recesses so as to reduce the friction between the reciprocating engine parts. The recesses have depths regularly varying in a sliding direction of the reciprocating engine part.

SUMMARY OF THE INVENTION

However, this related art does not refer to a cross sectional shape of the recess and an application to a rotational sliding device.

It is therefore an object of the present invention to provide a sliding device which greatly reduces a friction coefficient while maintaining an anti-seizing property, by properly setting pits formed on a sliding surface of the sliding device.

An aspect of the present invention resides in a sliding device which comprises a first sliding member rotatable on an axis of the first sliding member; a second sliding member slidably supporting the first member through viscous fluid; and at least a pit formed on a surface of at least one of the first and second sliding members so as to promote a flow of the viscous fluid, which has a component of a rotational direction of the shaft when the first member is rotated.

Another aspect of the present invention resides in a sliding device which comprises sliding members which slide with each other through viscous fluid; and at least a pit which is formed on a surface of at least one of the sliding members; wherein a ratio S/L ranges from 0 to 0.3 where L is a length of an opening of the pit along a sliding direction of the sliding member comprising the pits, and S is a length of the pit from a sliding surface of the sliding member having the pit to a bottom of the pit.

A further aspect of the present invention resides in a sliding device which comprises a shaft rotatable on an axis of the shaft; a sliding bearing supporting the shaft through viscous fluid; and at least a pit formed on an outer surface of the shaft. A surface of the pit is regarded as aggregation of unit planes each of which has an independent normal. A total area of the unit planes, each of which includes a component of the rotational direction of the shaft, is greater than a total area of unit planes, each of which includes a component opposite to the rotational direction of the shaft.

A further aspect of the present invention resides in a sliding device which comprises a shaft rotatable on an axis of the shaft; a sliding bearing supporting the shaft through viscous fluid; and at least a pit formed on an outer surface of the shaft. A longitudinal direction of the pit is inclined with respect to a direction perpendicular to a rotational direction of the shaft.

The other objects and features of this invention will become understood from the following description with reference to the accompanying drawings.

DETAILED DESCRIPTION OF THE INVENTION

Referring to FIGS. 1 through 4, there is discussed a first embodiment of a sliding device 1 according to the present invention.

Figure 1:
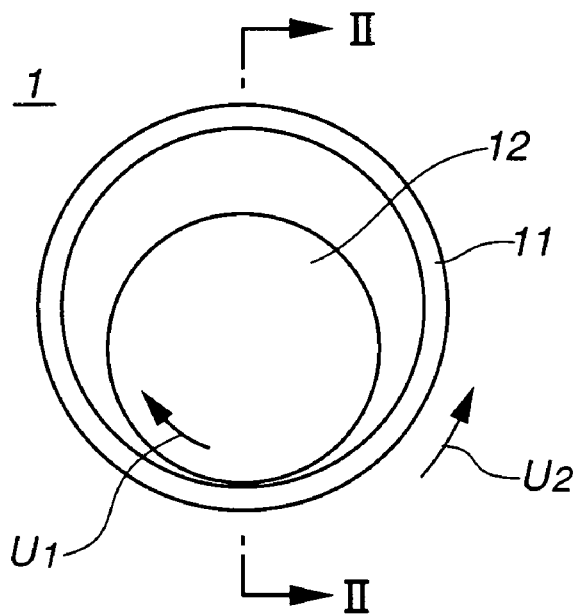
FIG. 1 is a plan view of the sliding device.
Figure 2:
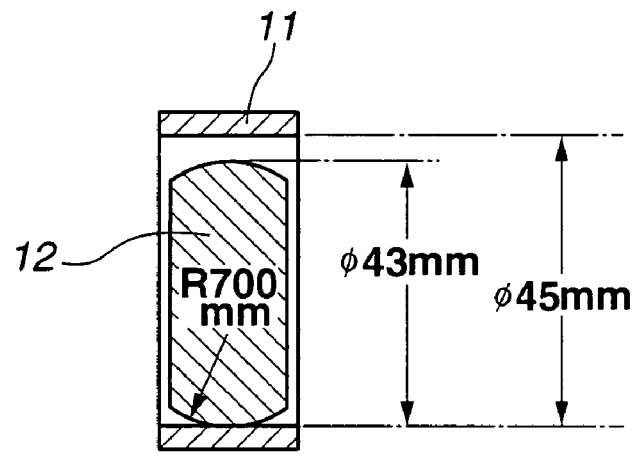
FIG. 2 is a cross sectional view along the line II-II in FIG. 1.

As shown in FIG. 1, sliding device 1 comprises a first member 11 as a first sliding member and a second member 12 as a second sliding member. Second member 12 is of a shaft like shape and rotates in a direction U1 shown in FIG. 1 with respect to first member 11. First member 11 is of a cylindrical shape and rotates in a direction U2 shown in FIG. 1 with respect to second member 12.

Figure 3:
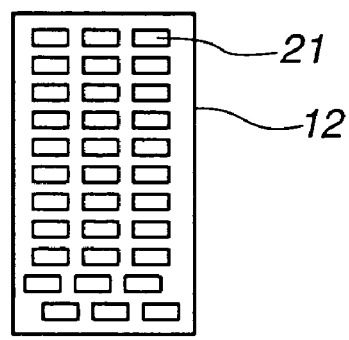
FIG. 3 is an enlarged view showing a sliding surface.

As shown in FIG. 3, a plurality of microscopic pits 21 are formed on a sliding surface 23 of second member 12. FIG. 3 schematically shows the arrangement of pits 21, and the actual arrangement and the size of pits 21 do not correspond to FIG. 3.

Figure 4:
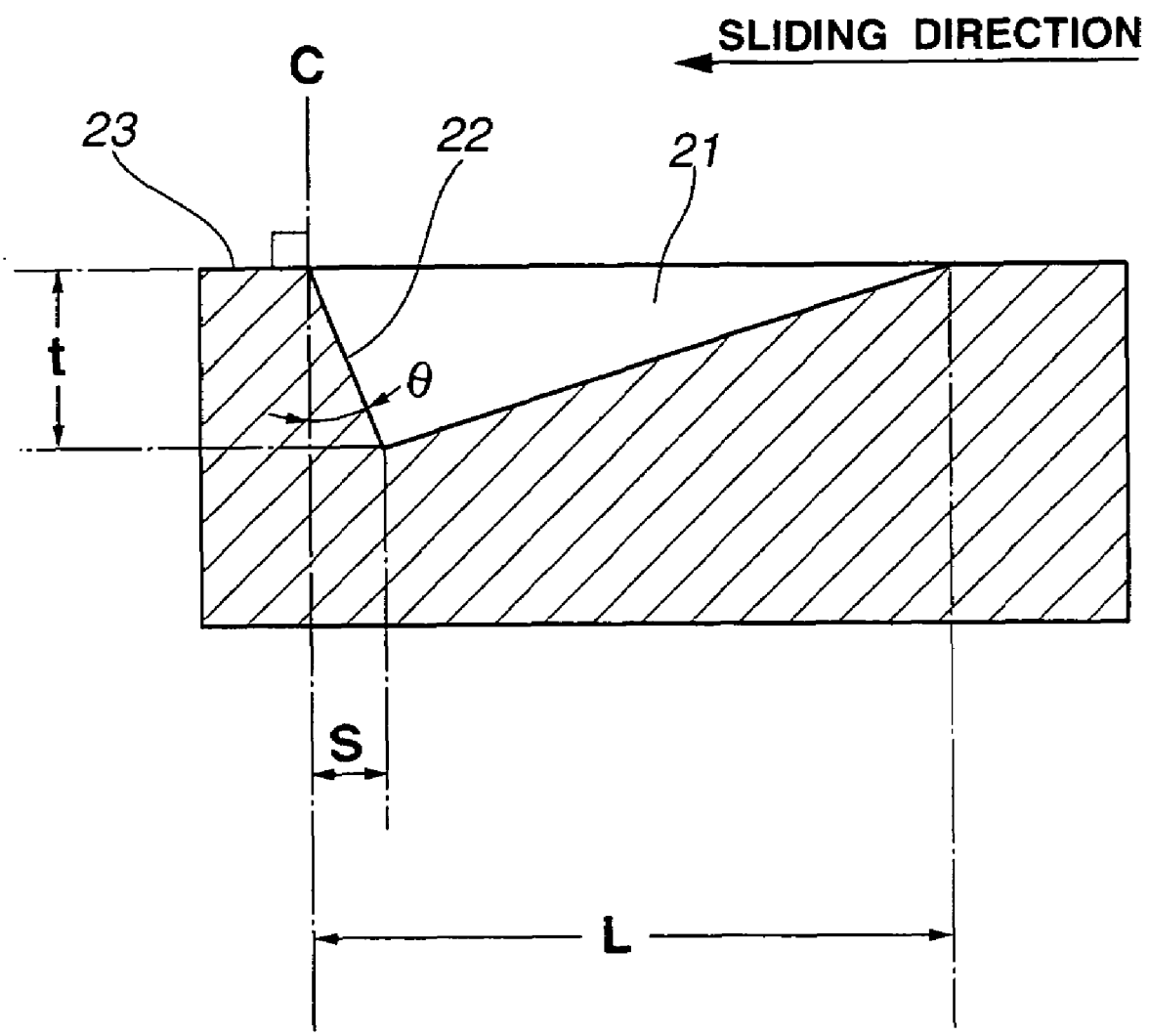
FIG. 4 is a cross sectional view showing a cross sectional shape of a pit formed on a sliding surface of the sliding member.

The shape of pits 21 has a relationship of 0<S/L≦0.3 where L is a length of pit 21 along the sliding direction, and S is a depth (length) from an end of an opening along the sliding direction to a lowest bottom position of pit 21, as shown in FIG. 4. It is preferable that 0<S/L≦0.2, and further preferable that 0<S/L≦0.1.

Further, pit 21 has a cross sectional shape in the perpendicular direction with respect to sliding surface 23 such that an angle θ of at least one wall 22 with respect to a line C perpendicular to a sliding surface 23 ranges from 0 to 30° (0°≦θ≦30°). When θ=0, wall 22 is perpendicular to sliding surface 23. It is preferable that angle θ of wall 22 with respect to line C ranges from 0° to 10° (0°≦θ≦10°), and further preferable that angle θ of wall 22 approaches 0° so as to form a right angle between wall 22 and sliding surface 23.

When it is satisfied the above condition that S/L≦0.3 or wall 22 is formed so as to be perpendicular to sliding surface 23 as possible, pits 21 increase a geometrical average thickness of oil film, and therefore a shear rate between sliding surfaces is decreased. Further, the microscopic dynamic pressure effect by pits 21 increases the thickness of the oil film. Therefore, the friction coefficient at sliding surface 23 is decreased.

That is, if S/L becomes greater than 0.3 or angle θ becomes greater than 30°, the microscopic dynamic pressure effect becomes insufficient, and the oil film thickness increasing effect is reduced. Therefore, it is not preferable that S/L and angle θ become out of the above discussed ranges, respectively, in view of reducing the friction coefficient.

The cross sectional shape of pit 21 is formed, for example, into a right-angled triangle, a W-shape and/or a rectangle. It is preferable that a wall located at a front side in the sliding direction is generally perpendicular to sliding surface 23.

The depth of pit 21 is formed such that a ratio h/t ranges from 0.04 to 5 ($0.04 \leqq h/t \leqq 5$) where t is a depth from sliding surface 23 to the deepest position in pit 21, and h is a thickness of oil film (normal oil film thickness) under the sliding condition. Such formed pits 21 perform the excellent friction reduction merit. If ratio h/t is smaller than 0.04 (h/t<0.04), a rate of a slid contact of the sliding surface increases. This increase is not preferable in view of degrading the anti-seizing performance. On the other hand, if ratio h/t is greater than 5 (h/t>5), the friction coefficient reduction effect becomes insufficient.

Further, it is preferable that an occupied area rate of pits 21 formed on sliding surface 23 ranges from 0.5% to 10% where the occupied area rate is a ratio of the total of opening areas of pits 21 with respect to the total area of sliding surface 23. If the occupied area rate is smaller than 0.5%, it becomes difficult to sufficiently gain the function of pits 21, and therefore the friction coefficient reduction effect becomes insufficient. On the other hand, if the occupied area rate is greater than 10%, the degree of the solid contact increases, and therefore the friction increases and the anti-seizing performance is degraded.

Figure 8:
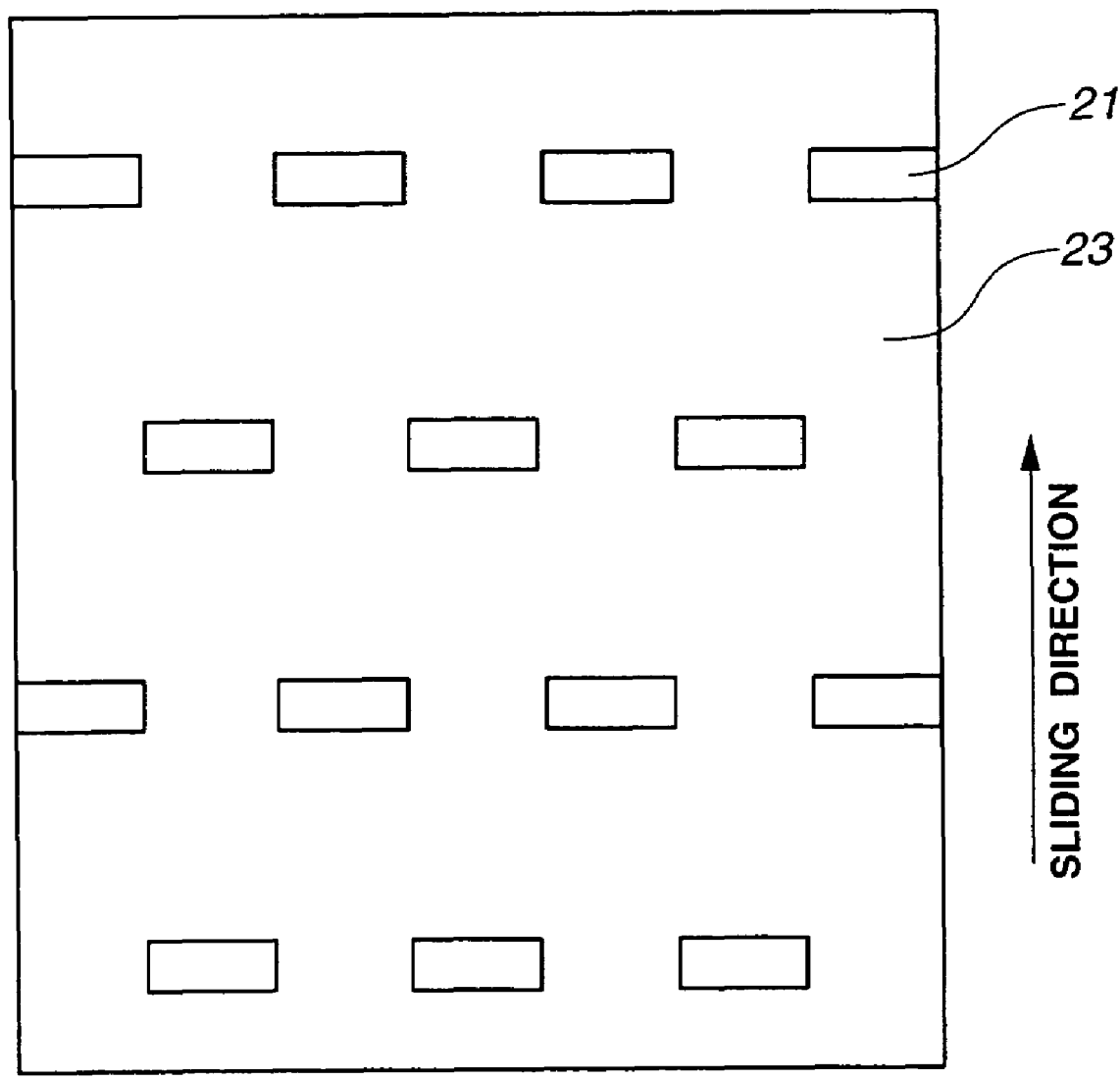
FIG. 8 is a view showing a pattern of the pits formed on the sliding surface.

An opening of pit 21, as viewed from the above direction of sliding surface 23, has a compressed shape whose long side extends along a direction perpendicular to the sliding direction. More specifically, a side of the opening along the perpendicular direction relative to the sliding direction is longer than a side of the opening along the sliding direction, as schematically shown in FIG. 8. It is preferable that a length of the short side of the opening along the sliding direction ranges 50 to 150 μm, and that a length of the long side of the opening along the perpendicular direction is 2 to 10 times the length of the short side.

The following is the reason for forming the opening of pit 21 into a compressed shape whose short side has a length from 50 to 150 μm is as follows. Since many sliding parts of an internal combustion engine are elastically deformed under the operating condition, the actual contact area of the sliding part becomes extremely smaller than a projection area of the sliding part which is assumed to be a rigid body. Accordingly, if the length of the short side of pit 21 becomes longer than 150 μm, the occupied rate of pits 21 with respect to the contact area increases, and therefore it becomes difficult to sufficiently gain the friction reduction effect. On the other hand, if the length of the short side of pit 21 becomes shorter than 50 μm, it becomes difficult to gain the dynamic pressure effect, due to the relationship between the depth of pit 21 and the size of pit 21. Therefore it becomes difficult to sufficiently gain the friction reduction effect thereby. Further, the following is the reason for setting the shape of the opening of pit 21 such that the length of the long side is 2 to 10 times that of the short side. If the long side is shorter than 2 times the short side, it becomes difficult to sufficiently gain the oil sump effect of pit 21 along the sliding direction.

On the other hand, in case of an actual sliding part for an engine such as a crankshaft, an oil film thickness at end portions of the crankshaft becomes thinner than other portions of the crankshaft due to the bending of the crankshaft in projection area between the shaft and a (metal) bearing. Under such a contacting condition, if the length of the long side becomes greater than 10 times the short side, pits 21 are located in the contacting area where the oil film is thin, and therefore the thickness of the oil film becomes thinner.

Pits 21 may be formed on at least of first and second members 11 and 12. However, when the hardness of the sliding surface of first member 11 is different from the hardness of the sliding surface of second member 12, it is preferable that pits 12 are formed on the harder one of the sliding surfaces of first and second members 11 and 12. By forming pits 21 on the harder one of the sliding surfaces of first and second members 11 and 12, it becomes possible to suppress the change of the depth of pits 21, and therefore the durability of the sliding device is improved.

Pits 21 may be formed by means of Eximer laser process, metal deformation process, MRF (Magneto-Rheological Finishing) process, or Masking-and-blasting process. Viscous fluid to be stayed between the sliding members is not limited to a specific one and may be normal lubricating oil.

EXAMPLE

On the basis of the above-discussed first embodiment, various examples having various cross sectional shapes of pits 21 were prepared, and the experiment for obtaining friction coefficients of the respect examples was carried out.

The sliding device used in the experiment comprises an outer cylinder functioning as first member 11 and an inner cylinder functioning as second member 12. The sliding device was tested using an inscribed two-cylinder test machine shown in FIG. 6.

Figure 6:
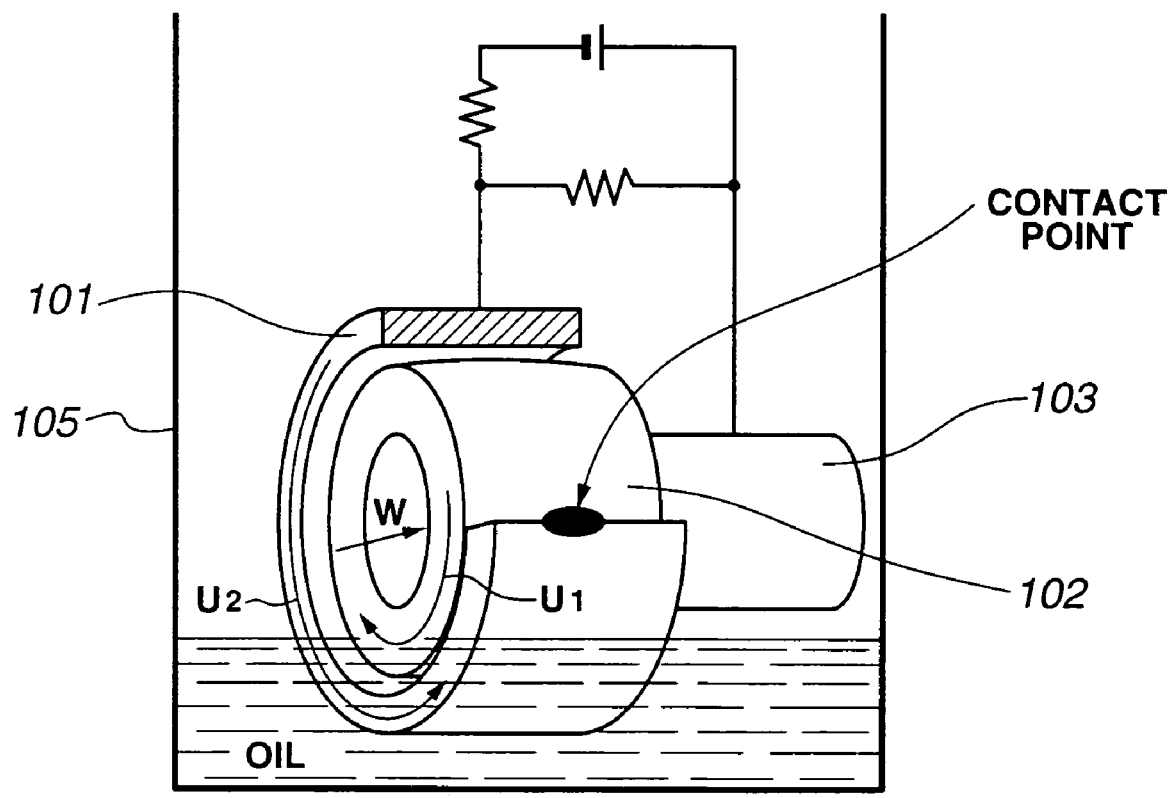
FIG. 6 is a schematic view showing an inscribed two cylinder test machine employed in the first embodiment.

As shown in FIG. 6, an outer cylinder 101 functioning as first member 11 was produced by pressingly inserting an aluminum metal member of an inner diameter φ45 mm in a steel cylinder of an outer diameter of φ45 mm. An inner cylinder 102 functioning as second member 12 was cylindrical and had an outer diameter of φ45 mm, and a radius of curvature of inner cylinder 102 along the longitudinal direction of curvature was R700 mm. Inner cylinder 102 was by carburizing, quenching and tempering a steel member defined by symbol SCM420H.

Inner cylinder 102 was supported by a shaft 103 and was contacted with outer cylinder 101 by receiving a predetermined radial load in the direction of the arrow W. Widths of inner cylinder 102 and outer cylinder 101 were 20 mm. An AC servomotor (not shown) is connected to each of outer cylinder 101 and inner cylinder 102 so that outer cylinder 101 and inner cylinder 102 are capable of being independently controlled in rotation speed and in rotational direction. By soaking outer cylinder 101 and inner cylinder 102 in oil defined by SAE 5W-30, which is stored in an oil bath, oil films were formed between outer cylinder 101 and inner cylinder 102.

The experiment was carried out under a condition that the radial load was set at 20 kg, a temperature of lubricating oil was set at 80° C., a relative rotation speed between outer cylinder 101 and inner cylinder 102 was varied from 0.3 to 12 m/s, and a friction coefficient of each Example was obtained by measuring a rotational torque generated between outer cylinder 101 and inner cylinder 102 by means of a torque sensor attached to inner cylinder shaft 103, by calculating a tangential force from the rotational torque and by dividing the tangential force by the radial load, where an average speed is denoted by (U1+U2)/2 and a relative speed is denoted by (U1−U2) when U1 is a speed of inner cylinder 102 and U2 is a speed of outer cylinder 101.

Examples and Comparative Examples

Each of Examples 1 through 6 was prepared by forming fine pits 21 according to the present invention on a surface of an inner cylinder of ϕ43 mm (diameter). Each of Comparative Examples 1 and 2 were prepared by forming pits, which were not adapted to the present invention, on a surface of the inner cylinder of ϕ43 mm (diameter). These pits were formed by means of Eximer laser process, metal deformation process, MRF process, and Masking-and-blasting process. Samples having cross sectional shapes of a right-angled triangle, a rectangle and an isosceles triangle shape were prepared by means of metal deformation process using indenters. Sample having a cross sectional shape of W-shaped bottom was prepared by means of Eximer laser process. Sample having a cross sectional shape of U-shape was prepared by means of masking and blasting process. After pits were formed, small protrusions formed at edges of the pits were removed by a lapping process using a tape lap film including particles of size 9 μm.

FIGS. 5A through 5E show cross sectional shapes of pits of Examples and Comparative Examples. In Figures, arrows show a relative sliding direction.

Figure 5A:
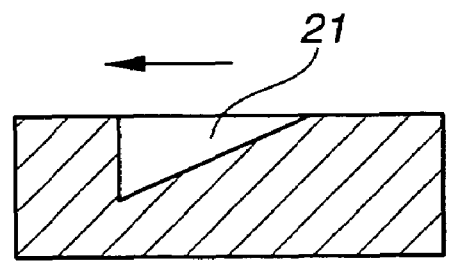
FIGS. 5A through 5E are sectional views showing cross sectional shapes of various pits.

Example 1 has pits whose cross sectional shape is a right-angled triangle, and a wall of the pit located at a front side in the sliding direction was set to have an rectangular angle with respect to a line along the sliding surface, as shown in FIG. 5A.

Figure 5B:
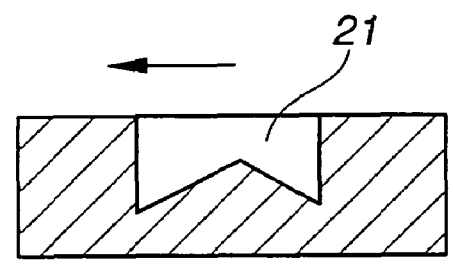

Example 2 has pits whose cross sectional shape is a W-shaped bottom, and walls of the pit located at a front side and a rear side in the sliding direction was set to have an rectangular angle with respect to the line along the sliding surface, as shown in FIG. 5B.

Figure 5C:
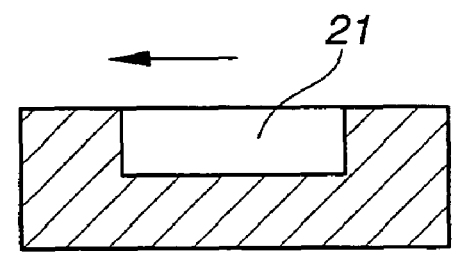

Example 3 has pits whose cross sectional shape is a rectangle, and walls of the pit located at a front side and a rear side in the sliding direction was set to have an rectangular angle with respect to the line along the sliding surface, as shown in FIG. 5C.

Example 4 has pits whose cross sectional shape is a right-angled triangle, and a wall of the pit located at a front side in the sliding direction was set to have an rectangular angle with respect to the line along the sliding surface, as shown in FIG. 5A. However, the size of the pit of Example 4 is different from that of Example 1.

Example 5 has pits whose cross sectional shape is a W-shaped bottom, and walls of the pit located at a front side and a rear side in the sliding direction was set to have an rectangular angle with respect to the line along the sliding surface, as shown in FIG. 5B. However, the size of the pit of Example 5 is different from that of Example 2.

Example 6 has pits whose cross sectional shape is a rectangle, and walls of the pit located at a front side and a rear side in the sliding direction was set to have an rectangular angle with respect to the line along the sliding surface, as shown in FIG. 5C. However, the size of the pit of Example 6 is different from that of Example 3.

Figure 5D:
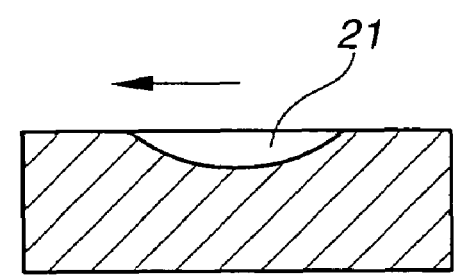

Comparative Example 1 has pits whose cross sectional shape is a U shape, as shown in FIG. 5D. Each wall of the pit has an angle greater than 30° with respect to a line perpendicular to the sliding surface and is slowly curved.

Figure 5E:
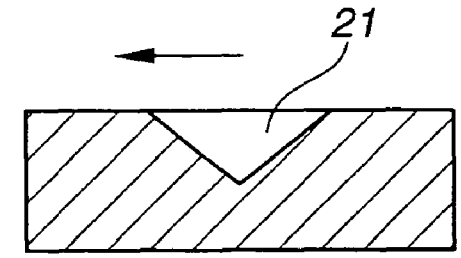

Comparative Example 2 has pits whose cross sectional shape is an isosceles triangle shape, as shown in FIG. 5E. Each wall of the pit has an angle greater than 45° with respect to a line perpendicular to the sliding surface and is slowly curved.

Table 1 represents the experimental result and specifications of each of Examples and Comparative Examples. The specifications include a size of the pit, an occupied rate of the total area of the pits with respect to the surface area, a depth of the pit and a cross sectional shape of the pit shown in FIGS. 5A through 5E.

Figure 7A:
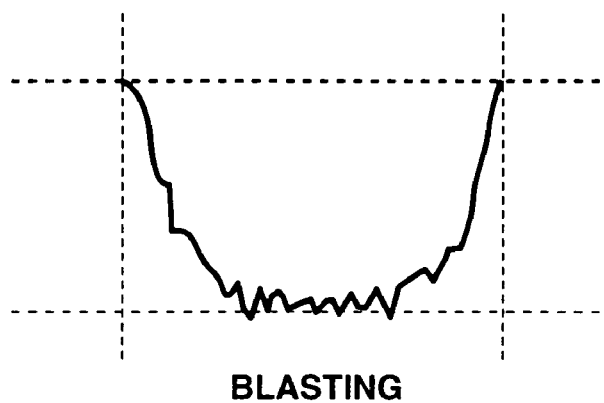
FIGS. 7A through 7C are cross sectional shapes of the pits where were tested to obtain a relationship between a ratio S/L and a friction coefficient.
Figure 7B:
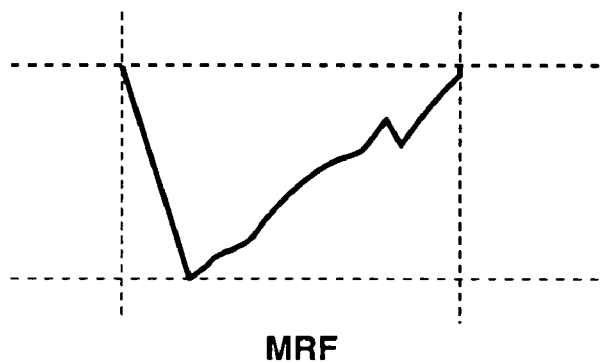
Figure 7C:
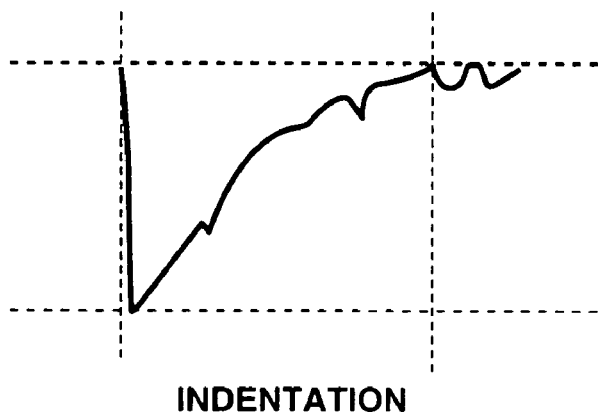

Subsequently, there is shown an experimental result as to the relationship between S/L of the cross sectional shape of the pit and the friction coefficient. FIGS. 7A, 7B and 7C show the measured cross sectional shapes of the pits of prepared Examples and Comparative Examples. FIG. 8 shows an arrangement pattern of the pits formed on sliding surface 23. The pits shown in FIGS. 7A, 7B and 7C were arranged as shown in FIG. 8.

Figure 9:
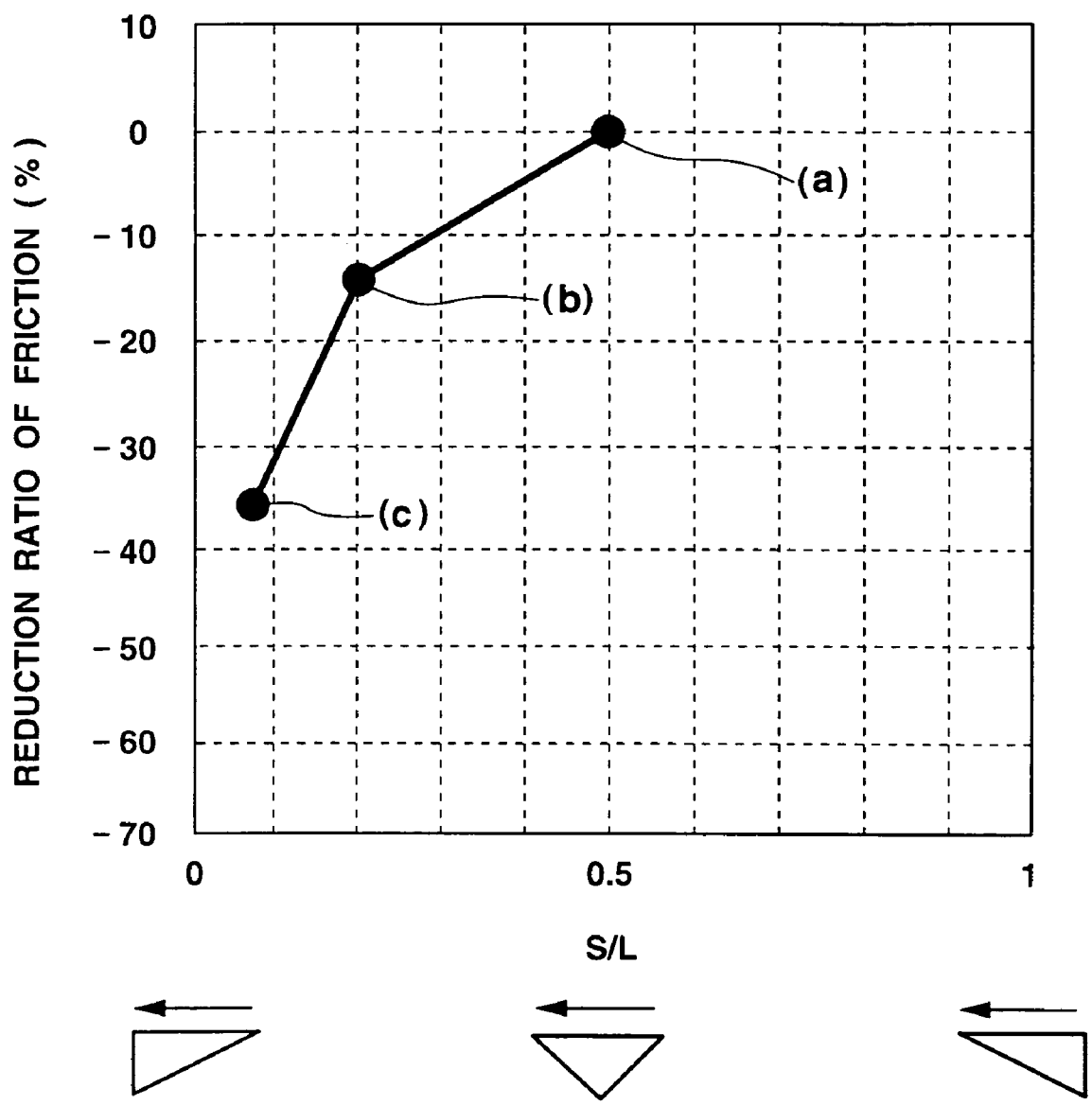
FIG. 9 is a graph showing a relationship between the ration S/L and the reduction ratio of the friction coefficient.

FIG. 9 shows a relationship between S/L and a reduction ratio (%) of the friction of each cross sectional shape shown in FIGS. 7A through 7C. The pit shown in FIG. 7A was formed by means of blasting process and had a relationship of S/L=0.5. The pit shown in FIG. 7B was formed by MRF process so that the wall located at a front side in the sliding direction had an angle with respect to a line perpendicular to the sliding direction and had a relationship of S/L=0.2. The pit shown in FIG. 7C was formed by indentation process so that the wall located at a front side in the sliding direction is perpendicular to the sliding direction and has a relationship of S/L≦0.1. The reduction ratio of the friction coefficient shown in FIG. 9 is a reduction ratio of each friction coefficient which is compared with that of the pit shown in FIG. 7B which has a relationship of S/L=0.5.

TABLE 1

| | Pit Size | | | | | Rate of friction coefficient |
| --- | --- | --- | --- | --- | --- | --- |
| | short side μm | long side μm | Pit rate % | Depth μm | Cross Sec. Shape | relative to Comparative Example 1 |
| Example 1 | 80 | 320 | 5 | 3 | FIG. 5A | 0.68 |
| Example 2 | 80 | 320 | 5 | 3 | FIG. 5B | 0.78 |
| Example 3 | 80 | 320 | 5 | 3 | FIG. 5C | 0.82 |
| Example 4 | 50 | 450 | 1 | 5 | FIG. 5A | 0.75 |
| Example 5 | 140 | 280 | 3 | 3 | FIG. 5B | 0.72 |
| Example 6 | 80 | 600 | 10 | 1 | FIG. 5C | 0.85 |
| Comp. Ex. 1 | 80 | 200 | 5 | 3 | FIG. 5D | 1 |
| Comp. Ex. 2 | 80 | 320 | 5 | 3 | FIG. 5E | 0.98 |

As is apparent from Table 1, all of Examples according to the present invention had the friction coefficients which were lower than those of Comparative Examples. It was found that the pit, which has a shape of a regular triangle having a perpendicular wall at a front side in the sliding direction, was particularly preferable in the friction coefficient in all Examples. Further, it was found that the friction coefficient tends to decrease as the inclination of the wall in the pit becomes steeper (Comparative Example 2 and Examples 1-5) rather than becomes slow (Comparative Example 1).

FIG. 9 shows that the friction coefficient decreases as S/L decreases. Particularly, when S/L of the pit had a value of about 0.4, the reduction ratio was decreased by 10%. Further it was found that the reduction effect of the friction coefficient was obtained when S/L=0.3. When S/L is smaller than or equal 0.2 (S/L≦0.2), the gradient of the reduction ratio was greater than that in case that S/L ranges from 0.3 to 0.5. That is, it was found that when S/L≦0.2, the reduction effect of the friction coefficient became large. Accordingly, it is preferable that S/L is smaller than or equal to 0.2. Further, it is further preferable that S/L is smaller than or equal to 0.1.

Although there has not yet been cleared the mechanism of the reduction of the friction coefficient in the sliding member, it is guessed gassed as follows. By forming fine pits in the sliding direction, an average oil film thickness increases by the amount of the volume of the pits as compared with that on a smooth surface, and therefore an average shear rate is decreased. Additionally, by forming the pit such that a wall extending in the direction perpendicular to the sliding direction becomes steep so as to approach an vertical wall as possible, it becomes possible to flow a large quantity of oil to the contacting surface. Further, by generating a microscopic dynamic pressure effect by the pits, the operating condition of generating the friction reduction effect is broadened.

As discussed above, by forming microscopic pits on a sliding surface of at least one of two sliding members between which lubricating oil exists and by forming at least one wall in the pit to be steep and to be perpendicular to the sliding directing as possible, the friction coefficient is decreased and the sliding performance of the sliding members is improved. Further, this arrangement increases the thickness of oil film so as to decrease the friction coefficient, and therefore the abrasion durability and the anti-seizing performance are improved.

Referring to FIGS. 10 through 16, there is discussed a second embodiment of the sliding member according to the present invention.

Figure 10:
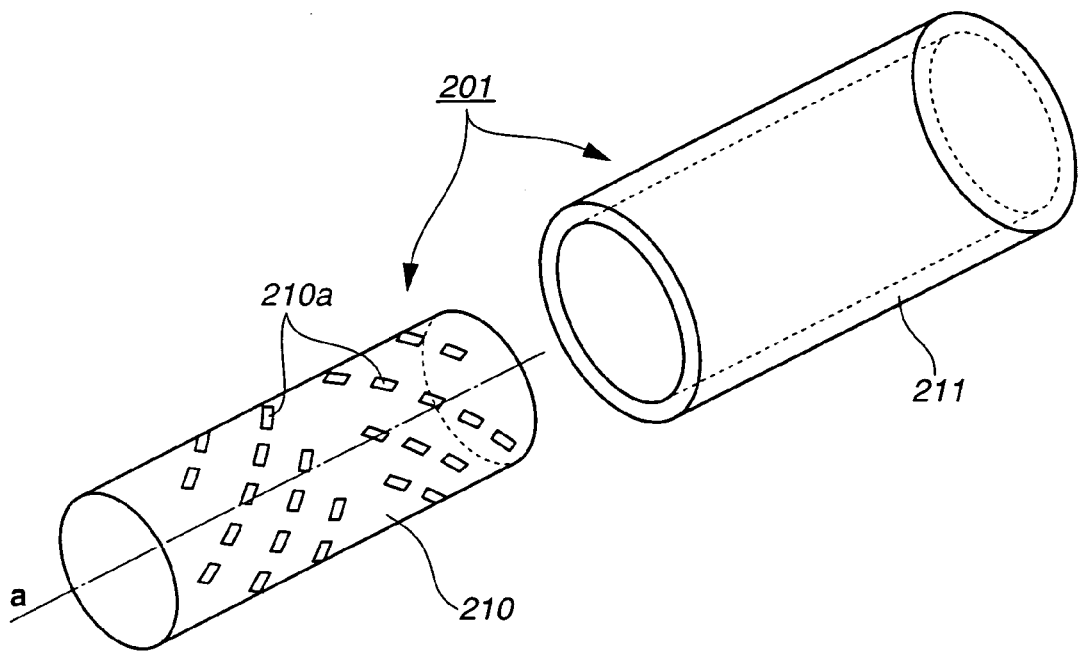
FIG. 10 is an exploded perspective view showing the sliding device according to a second embodiment according to the present invention.

FIG. 10 shows a schematic view showing the embodiment of a sliding device 201 according to the present invention. Sliding device 201 comprises a column shaft 210 rotating on a center axis a and a cylindrical sliding bearing 211 of supporting the shaft 210. A longitudinal dimension of shaft 210 may be elongated as compared with that shown in FIG. 10. Lubricating oil (not shown) is supplied between a surface of shaft 210 and an inner surface of sliding bearing 211. It is necessary that a suitable quantity of lubricating oil is provided at the sliding surface, in order to decrease a friction generated at the sliding surface between shaft 10 and sliding bearing 211. A plurality of pits 210a are provided on the surface of shaft 210.

In sliding device 201 in which shaft 210 rotatingly slides in cylindrical sliding bearing 211, a flow of lubricating oil is generated according to the rotation of shaft 210. It is presumed that the lubricating oil is involved by shaft 210 and stably flows in the rotational direction of shaft 210 so as to form a layer of oil (laminar flow), in order to reduce the friction generated at the sliding surface. Therefore, the second embodiment of the sliding device 201 according to the present invention is arranged such that lubricating oil stably flows on the surface of shaft 210 in the rotational direction of shaft 210. More specifically, the second embodiment is arranged such that pits 210a have a function of promoting the flowing of lubricating oil toward the rotational direction of shaft 210 in addition to the function of staying lubricating oil. The function of promoting the flowing of lubricating oil includes a function of introducing the flow of lubricating oil toward the rotational direction of shaft 210 and a function of pushing out the lubricating oil toward the rotational direction of shaft 210.

Figure 11A:
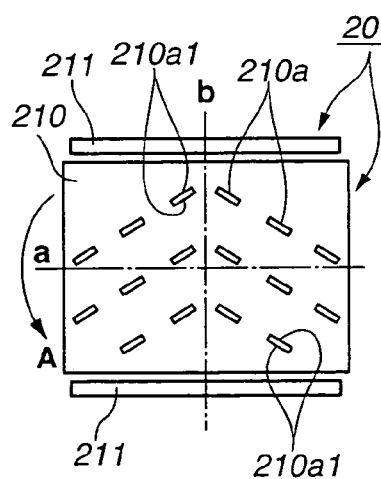
FIGS. 11A through 11C are side views showing arrangements of pits formed on the shafts.
Figure 11B:
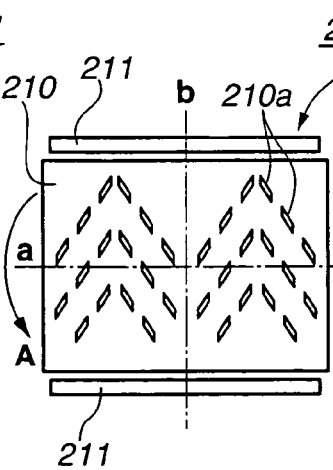
Figure 11C:
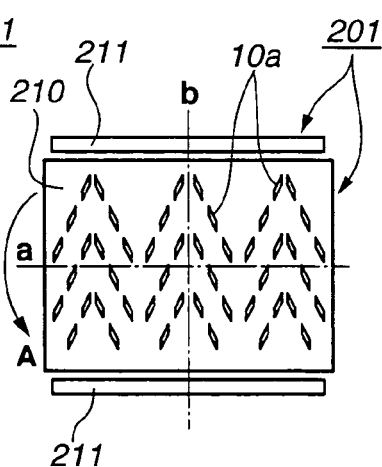

There is discussed preferred arrangements of pits 210a, which arrangement has the function of introducing the flow of the lubricating oil to the rotational direction of shaft 210. FIGS. 11A, 11B and 11C are side views showing several arrangements of pits 10a on shaft 210 according to the second embodiment of the present invention. FIG. 11A shows a basic pattern of the arrangement of pits 210a provided on the surface of shaft 210. First, there is explained as the arrangement of pits 210a shown in FIG. 11A. The arrangement of pits 210a shown in FIG. 11A are represented so as to include a plurality of structural elements relating to the arrangements of pits 210a. For convenience of writing, each of the structural elements is discussed separately.

The plurality of pits 210 are provided on the surface of shaft 210. Shaft 210 is rotated in the cylinder of sliding bearing 211 along the direction shown by the arrow A shown in FIGS. 11A through 11C. As discussed above, reducing the friction generated at the sliding surface is built on premises that the lubricating oil stably flows toward the rotational direction of shaft 210. Herein, it is considered that long side walls 210a1 of each pit 210a change the flowing direction of the lubricating oil flowing along the direction A in FIG. 11A so as to introduce the lubricating oil toward the longitudinal direction of pits 210a. Therefore, pits 210a are arranged to be inclined relative to the direction perpendicular to the longitudinal direction, without arranging pits 210a so that long side wall 210a1 of each pit 210 is directed to be perpendicular to the rotational axis a of shaft 210.

It is preferable that an angle between the longitudinal direction of pit 210 and the direction perpendicular to the rotational axis a is greater than 0° and not greater than 60°. More preferably, the angle is greater than 30° and not greater than 60°. By setting the angle between the longitudinal direction and the angle perpendicular to the rotational axis a within the range from 30° to 60°, pits 210a have both functions of promoting the flowing of lubricating oil toward the rotational direction of shaft 10 and of staying lubricating oil.

Subsequently, it is preferable that the lubricating oil is equivalently supplied on the sliding surface in order to reduce the friction generated in sliding device 201. In order to achieve such equivalent supply of the lubricating oil on the sliding surface, it is necessary to control the flow of the lubricating oil which is introduced by pits 210a. Therefore, the flow of the lubricating oil is controlled by pits 210a of the second embodiment according to the present invention such that the lubricating oil is equivalently supplied to the whole sliding surface without preventing the interference of the flows of the lubricating oil on the sliding surface of shaft 210. That is, it is considered that this arrangement of pit 210a according to the present invention prevent the cancellation of the flows of the lubricating oil due to the interference between the flows, the limited directional flow of the lubricating oil and the unequal supply of the lubricating oil to the sliding surface. Subsequently, there is discussed the arrangement of pits 210a in more detail.

The plurality of pits 210 are aligned on an oblique line which is oblique with respect to the axial direction of shaft 210 so that the longitudinal sides 210a1 of each pit 210a aligned on the oblique line are parallel to the longitudinal sides of the other pits 210a on the oblique line. Therefore, the streamline of the lubricating oil introduced along the direction of the longitudinal sides of the aligned pits 210a is further elongated by the plurality of pits 210a aligned so as to ensure the same directional streamlines in the wide area of the sliding surface.

Pits 210a are arranged to be mirror symmetry with respect to a plane b perpendicular to the rotational axis a of shaft 210 as clearly shown in FIG. 11A. Further, all of pits 210a in one of two areas divided by the plane b are parallel with each other. With the thus arranged pits 210a, the flows of the lubricating oil also become mirror symmetry with respect to the plane b. Therefore, the lubricating oil is equivalently supplied to both areas divided by the plane b, and the streamlines of the lubricating oil introduced by pits 210a become parallel so as not to cause the interference among the flows.

Further, pits 210a are arranged such that pits 210a provided at far positions apart from the plane b are advanced with respect to the rotational direction A as compared with pits 210a provided at near positions near to the plane b so that the aligned pits 210a are positioned on an oblique line. This arrangement enables the lubricating oil to be supplied to the total area of the sliding surface. The position of the plane b in the longitudinal direction of shaft 210 may be properly determined according to the sliding condition of shaft 210 in the cylinder of sliding bearing 211.

Further, pits 210a may be arranged as shown in FIGS. 11B and 11C based on the arrangement shown in FIG. 11A. That is, the arrangement of pits 210a shown in FIG. 11A are repeatedly provided on the sliding surface of shaft 210 twice as shown in FIG. 11B and three times as shown in FIG. 11C. These arrangements of pits 210a shown in FIGS. 11B and 11C strengthen the relationship of the flows of the lubricating oil among the compacted lows of pits 210a while ensuring the advantages gained by the arrangement of FIG. 11A. Further, the flows of lubricating oil guided by the lows of pits 210a are directed to a plane c shown in FIG. 13 and are gathered by each low of pits 210a. This arrangement suppresses the disturbance of the flows of the lubricating oil which is introduced under a high engine speed condition.

Subsequently there is discussed preferred examples for ensuring a function that pits 10a push out (flowing) lubricating oil toward the rotational direction A of shaft 210, with reference to FIGS. 12A, 12B, 12C, 12D, 12E and 13. FIG. 12A through 12E are enlarged cross sectional views in case that pit 210a is cut along a plane perpendicular to the rotational axis a. FIG. 13 is an enlarged perspective view of pit 210a as viewed from the upward direction.

A cross sectional shape of pits 210a may be freely formed in addition to the examples shown in FIGS. 12A through 12E. Herein, there is discussed a common factor of pits 210a which have a function of flowing the lubricating oil in the rotational direction A of shaft 210. Surfaces of constructing each pit 210a have a unit plane and are regarded as aggregation of unit planes each of which has an independent normal. When the normal includes a component of the rotational direction A of shaft 210, the unit plane has a function of flowing lubricating oil toward the rotational direction A of shaft 210 according to the rotation of the shaft 210. Therefore, pit 210a has a lot of unit planes, and it is considered that such pit 210a has a function of flowing lubricating oil. On the basis of this consideration, pits 210a are constructed such that a total of areas of unit planes including a component of the rotational direction A of shaft 210 is greater than a total of areas of unit planes including a component opposite to the rotational direction A of shaft 210.

Figure 12A:
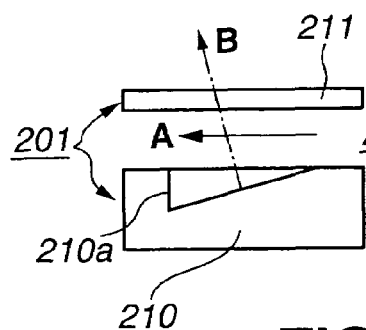
FIGS. 12A through 12E are enlarged cross sectional views showing cross sectional shapes of various pits.
Figure 12B:
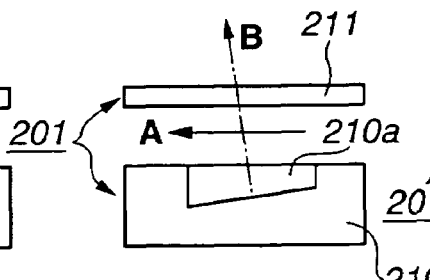
Figure 12C:
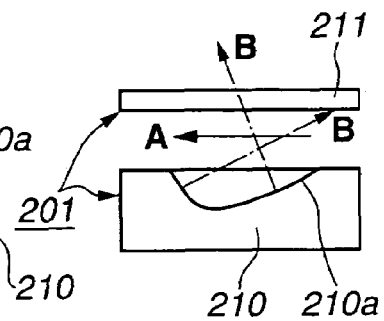
Figure 12D:
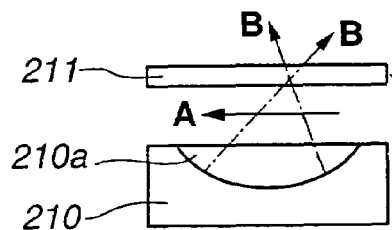
Figure 12E:
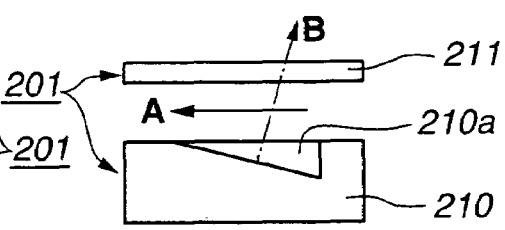
Figure 13:
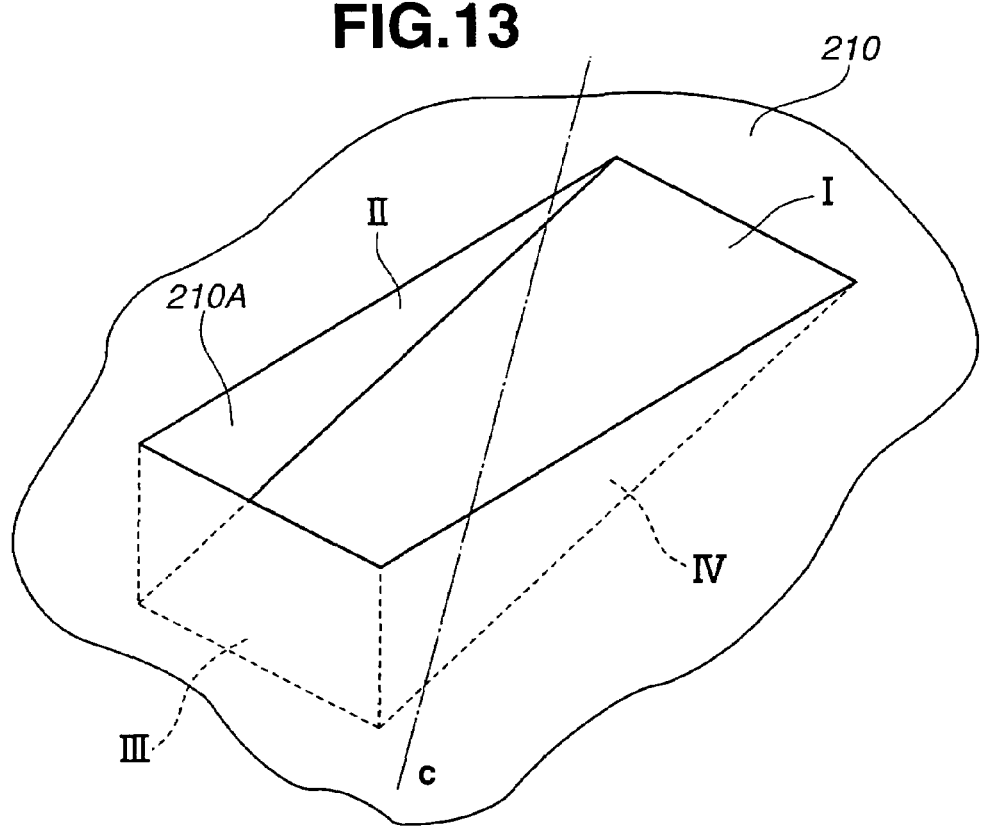
FIG. 13 is an enlarged perspective view showing the pit shown in FIG. 12B.

A chain-line arrow extending from a bottom portion of pit 210a in each of FIGS. 12A through 12E is obtained by extracting one or two unit planes of each pit 210a and by obtaining a normal B of each unit plane. Normal B shown in FIGS. 12A, 12B and 12C includes a component of the rotational direction A. That is, in these examples in FIGS. 12A, 12B and 12C, the total of the areas of the unit planes including the component of the rotational direction A is greater than the total of the areas of the unit planes including the component opposite to the rotational direction. On the other hand, the normal B shown in FIG. 12E includes a component opposite to the rotational direction A. That is, in the example of FIG. 12E, the total of the areas of the unit planes including the component opposite to the rotational direction A is greater than the total of the areas of the unit planes including the component of the rotational direction A. In the example of FIG. 12D, the total of the areas of the unit planes including the component of the rotational direction A is almost equal to the total of the areas of the unit planes including the component opposite to the rotational direction A. Consequently, the cross sectional shape of pit 210a shown in each of FIGS. 12A, 12B and 12C is preferable in view of ensuring the function of flowing lubricating oil toward the rotational direction A of shaft 210. On the other hand, the cross sectional shape of pit 210a shown in each of FIGS. 12D and 12E is not preferable in view of ensuring the function of flowing lubricating oil toward the rotational direction A.

Further, FIG. 13 shows an example of forming pit 210a so that the longitudinal direction of pit 210a is inclined with respect to the perpendicular direction of the rotational direction A of shaft 210. In FIG. 13, a chain line c is a line of cutting each pit 210a as shown in FIGS. 12A through 12E. Therefore, a cross section along the cutting line c in FIG. 13 corresponds to FIG. 12B. In the example of pit 210a shown in FIG. 13, planes I and II correspond to the plane whose normal B includes the component of the rotational direction A of shaft 210, and planes III and IV correspond to the plane whose normal B includes the component opposite to the rotational direction A of shaft 210. Therefore, it is preferable that pit 210a is formed such that the total of the areas of the planes I and II is greater than the total of the areas of the planes III and IV.

By forming an opening of pit 210a of shaft 210 into a rectangular or oval shape, the merit of flowing lubricating oil is further maintained, and the merit of reducing the friction is also obtained.

It is preferable that the shape of the opening of pit 210a of shaft 210 is formed such that a width dimension perpendicular to the longitudinal direction of the opening shape ranges from 50 to 150 μm, and that a longitudinal dimension of the opening shape is 2 to 10 times the width dimension. When the opening shape of pit 210a is formed so as to satisfy the above conditions, it becomes possible to flow a sufficient quantity of lubricating oil to the sliding surfaces, to obtain the friction reducing effect under the sliding condition and to suppress a breakage such as fiction and seizing at an end portion of sliding bearing 211.

Further, it is preferable that the total of the areas of the openings of all pits 210a is greater than 0.3% of the sliding surface area of shaft 210 and is smaller than or equal to 10% of the sliding surface area. If the total of the areas of the opening is smaller than or equal to 0.3% of the sliding surface area, it is difficult to sufficiently obtain the anti-seizing effect. If the total of the areas of the opening is greater than 10% of the sliding surface area, there is caused a problem of generating a metal-to-metal contact.

With the thus arranged embodiment according to the present invention, pits 210a formed on the sliding surface of shaft 210 has a function of supporting lubricating oil and a function of promoting the flowing of lubricating oil toward the rotational direction A of shaft 210. Therefore, lubricating oil is supplied to the sliding surface and reduces the disturbance of the flowing of the lubricating oil generated during the high speed rotation of shaft 210, and therefore the friction reduction effect is generated in sliding device 201.

Shaft 210 is applicable to a crankshaft and a camshaft for an internal combustion engine. Further, the engine may be a variable compression ratio engine. Such a variable compression ratio engine improves a fuel consumption by controlling a stroke of a piston according to the engine operating condition and consequently provides substantial energy savings.

Figure 14:
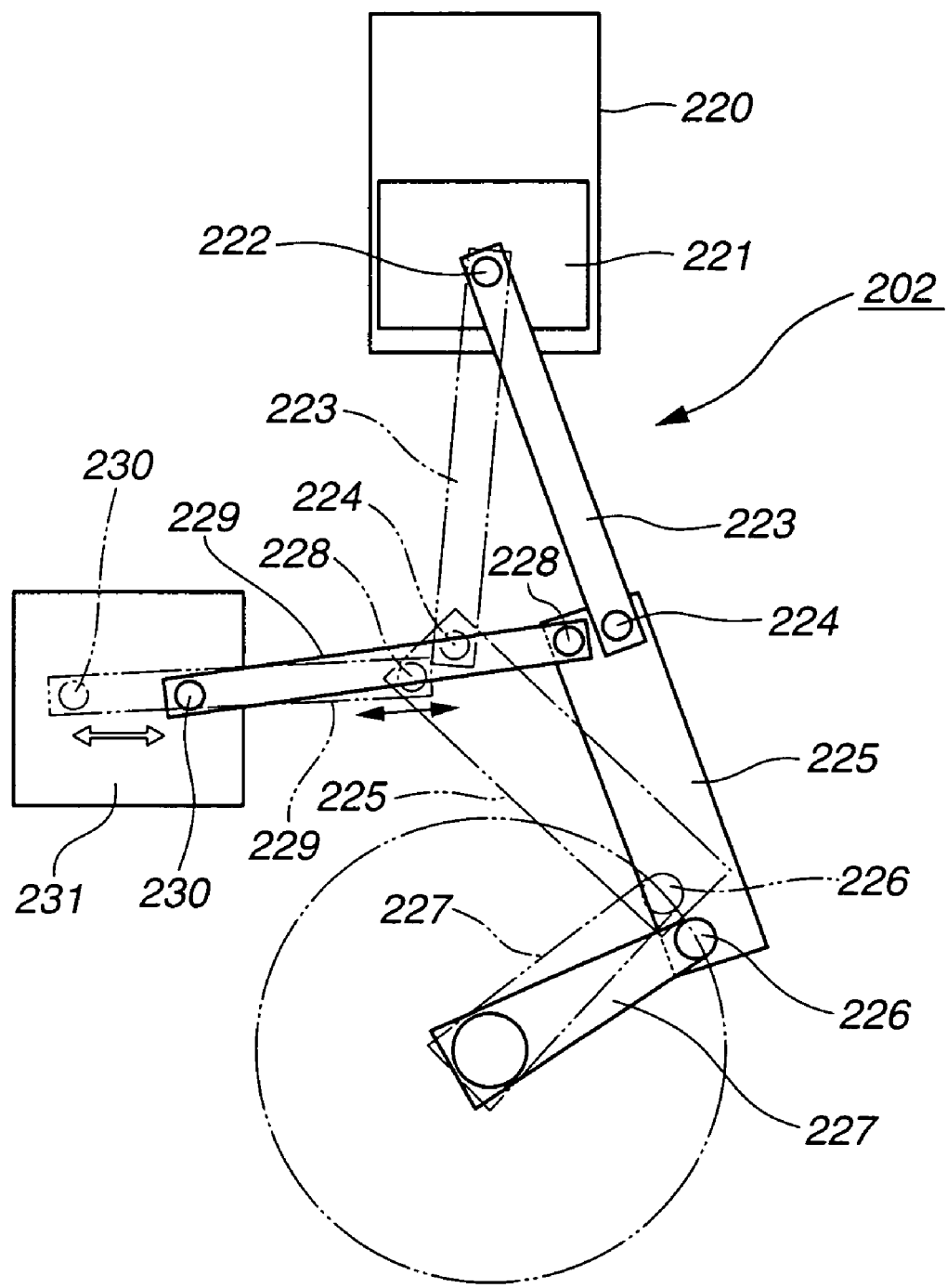
FIG. 14 is a schematic view showing a variable compression ratio engine to which the shaft according to the present invention is applicable.

FIG. 14 is a schematic view showing a variable compression ratio engine 202 to which shaft 210 according to the present invention is applicable. An end portion of a first connecting rod 223 is connected through a piston pin 222 to a piston 221 reciprocating in a cylinder 220. The other end portion of first connecting rod 223 is swingably connected to an end portion of a second connecting rod 225 through a connecting-rod connecting pin 224. Further, the other end portion of second connecting rod 225 is rotatably connected to a crankshaft through a crank pin 226. Further the end portion of the second connecting rod 225 is swingably connected to an end portion of a control rod 229 through a control-rod connecting pin 228 located adjacent to connecting-rod connecting pin 224. The other end portion of control rod 229 is connected to a control mechanism 231 through a control-mechanism connecting portion 230 located opposite to control-rod connecting pin 228. A position of control-mechanism connecting portion 230 is capable of being changed by control mechanism 231.

With this arrangement of the variable compression ratio engine, first and second connecting rods 223 and 225 are bent into a dogleg according to a locus of a connecting-rod connecting portion 224 within a swingable range of control rod 229 and transmits a power to crankshaft 227. By changing a position of control-mechanism connecting portion 230 through the operation of control mechanism 231, the bent degree of the dogleg of first and second connecting rods 223 and 225 is controlled, and therefore a stroke length of piston 221 is controlled. The shaft 210 according to the second embodiment of the present invention is applicable to piston pin 222, connecting-rod connecting pin 224, control-rod connecting pin and crank pin 226 of the variable compression ratio engine.

Connecting-rod connecting pin 224 and control-rod connecting pin 228 may be constructed by one pin, and first and second connecting rods 223 and 225 and control rod 229 may be connected with each other through the common pin.

EXAMPLE

Subsequently, for the purpose of specifying a preferable oblique angle of the longitudinal direction of pit 210a with respect to a direction perpendicular to the rotational direction A of shaft 210 and of confirming the friction reducing merit of pit 210a shown in FIGS. 12A through 12E, sliding device 210 was actually prepared, and friction experiment was executed using the prepared device 210. More specifically, there were prepared a plurality of Examples of sliding devices 201 which have pits 210a formed into various shapes in cross sectional shape and the above-discussed oblique angle, respectively. As to these prepared Examples, there was executed the friction test for calculating a friction coefficient generated on a sliding surface of each Example.

There is discussed a production process of the tested Examples employed in the experiment.

Figure 15:
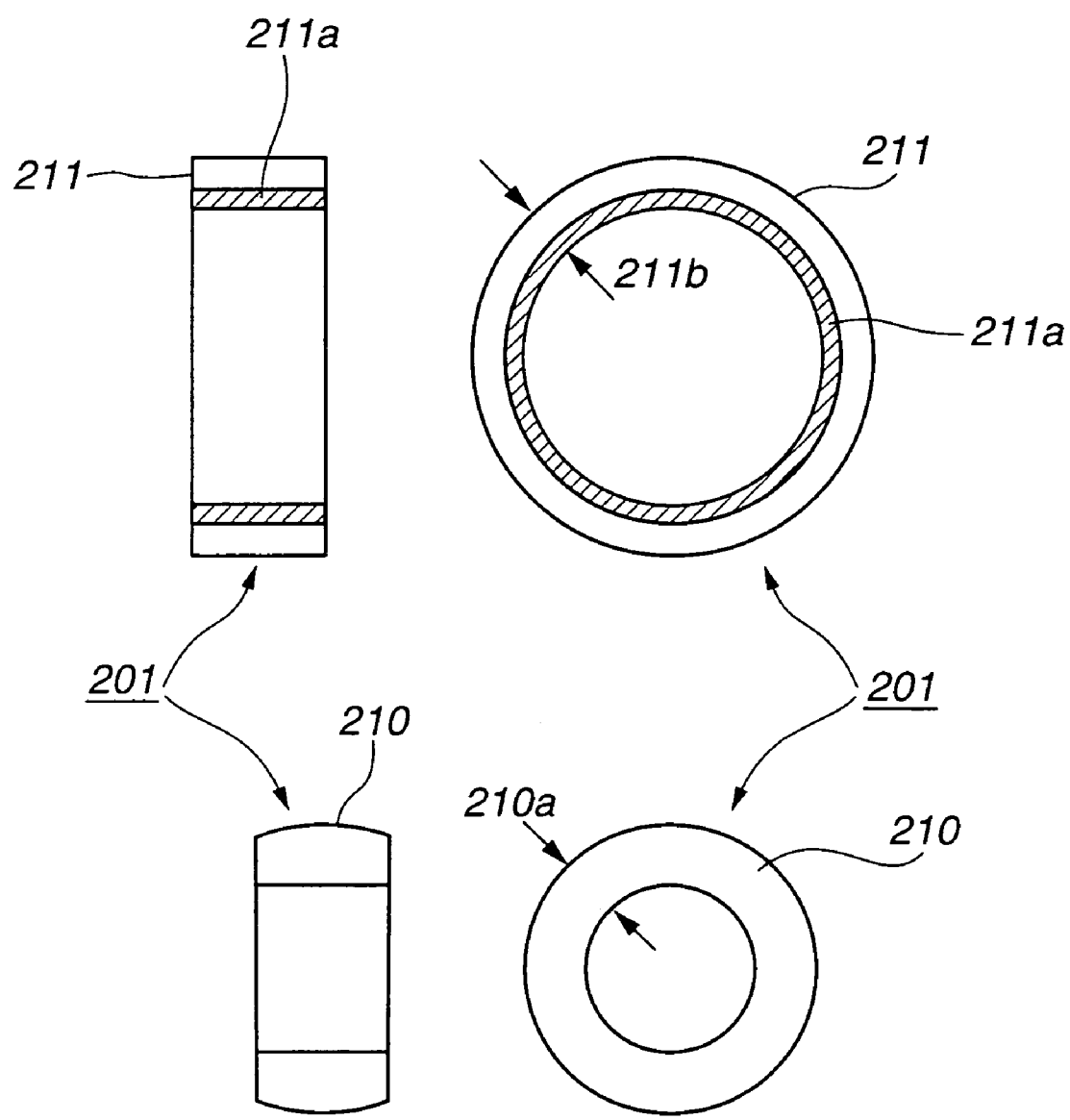
FIG. 15 is a view showing an outer cylinder and an inner cylinder of the sliding device employed in the experiment.

FIG. 15 shows a horizontal cross sectional view and a vertical cross sectional view of the sliding device 201 employed in the experiment. Bearing metal 211 was produced by press-fitting an aluminum bearing 211 of inner diameter of φ45 mm into a steel cylinder of outer diameter of φ45 mm. On the other hand, shaft 210 was formed cylindrical and had an outer diameter of φ43 mm, and a radius of curvature of shaft 210 along the longitudinal direction of curvature was R700 mm. Shaft 10 was obtained by carburizing, quenching and tempering steel defined symbol SCM420H. Both thickness 210d of column shaft 210 and thickness 211b of bearing metal 211 were 20 mm.

Pits 210a were formed on the outer surface of each shaft 210 by means of a micro-indentation or micro-blasting. In the process of the micro-indentation, an indenter for forming desired pits was prepared, and pits 210a were formed by pressing the indenter on the surface of shaft 210 so as to apply plastic deformation to the surface of shaft 210. In the process of the micro-blasting, microscopic shapes of pits were formed on a resin mask by utilizing an optical lithography, the prepared resin mask was attached on the cylinder surface of shaft 210, and a blasting was processed on the masked surface to form pits 210a on the surface of shaft 210. Mean size of aluminum grains used in the micro-blasting was 20 μm, and the injection condition of the aluminum grains was that a distance between a blasting nozzle and the masked surface was 100 mm, a flow rate of the aluminum grains was 100 g/min., and an injection pressure was 0.4 Mpa. After pits 210 were formed, small protrusions formed at edges of pits 210a were removed by lapping using a tape lap film including particles size of 9 μm.

Table 2 shows Examples of pits 210a formed on the surface of the tested shaft 210 and the experimental result.

TABLE 2

| | Pit Size | | | | | Long. | Con. A | Con. B |
| | Short side μm | Long side μm | Pit rate % | Depth μm | Cross Sec. Shape | Dir. Oblique Angle | μ1 = 5 m/s μ1 = −1 m/s F. C. rate | μ1 = 5.5 m/s μ1 = 16.5 m/s F. C. rate |
| --- | --- | --- | --- | --- | --- | --- | --- | --- |
| Example 7 | 80 | 320 | 5 | 3 | FIG. 12A | 0 | 0.68 | 0.52 |
| Example 8 | 50 | 450 | 1 | 5 | FIG. 12A | 0 | 0.75 | 0.65 |
| Example 9 | 140 | 280 | 3 | 3 | FIG. 12A | 0 | 0.72 | 0.62 |
| Example 10 | 80 | 160 | 10 | 1 | FIG. 12A | 0 | 0.85 | 0.68 |
| Example 11 | 80 | 320 | 5 | 2 | FIG. 12A | 30 | 0.65 | 0.42 |
| Example 12 | 80 | 320 | 5 | 3 | FIG. 12D | 60 | 0.73 | 0.95 |
| Example 13 | 80 | 320 | 5 | 3 | FIG. 12D | 45 | 0.73 | 0.90 |
| Example 14 | 80 | 320 | 5 | 3 | FIG. 12D | 30 | 0.68 | 0.95 |

TABLE 2-continued

|  | Pit Size | | | | Long. | Con. A | Con. B |
|---|---|---|---|---|---|---|---|
|  | Short side μm | Long side μm | Pit rate % | Depth μm | Cross Sec. Shape | Dir. Oblique Angle | μ1 = 5 m/s μ1 = −1 m/s F. C. rate | μ1 = 5.5 m/s μ1 = 16.5 m/s F. C. rate |
| Comp. Example 3 | 80 | 320 | 5 | 3 | FIG. 12D | 0 | 1 | 1 |
| Comp. Example 4 | 80 | 320 | 5 | 3 | FIG. 12D | 70 | 0.98 | 1.05 |
| Comp. Example 5 | 80 | 320 | 5 | 3 | FIG. 12D | 0 | 1.30 | 1.50 |

In each tested member, an opening of pit 210*a* was rectangular, a short side of the opening ranged from 50 to 150 μm, and a long side of the opening was 2 to 10 times the long side. That is, pits 210*a* of the tested samples were formed preferably in the shape of the opening.

A rate of the total area of the openings of pits 210*a* for each Example was within a range from 0.3 to 10% of the sliding surface area of shaft 210. That is, pits 210*a* of Examples 7 through 14 were formed preferably in the rate of the total area of pit with respect to the surface area of shaft 210.

Subsequently, as to the cross sectional shape of pit 210*a* of each Example, Examples 7 through 11 had pits 10*a* shown in FIG. 12A. Examples 12 through 14 and Comparative Examples 3 and 6 had pits 210*a* shown in FIG. 12D. Comparative Example 5 had pits 10*a* shown in FIG. 3E. That is, Examples 7 through 11 had pits 210*a* which had a preferable cross sectional shape in the second embodiment according to the present invention.

As to the oblique angle (longitudinal direction oblique angle) of the longitudinal direction of pit 10*a* with respect to a direction perpendicular to the rotational direction A of shaft 210, Examples were set to have various oblique angles which were greater than 0°.

The arrangement of pits 210*a* provided on the outer surface of shaft 210 of Examples was uniformed into one common pattern shown in FIG. 11A, in order to determine the advantageous Example. If pits 210*a* are variously arranged by each Example, it is difficult to specify the advantageous Example. That is, in order to properly compare Examples, conditions except for the oblique angle and the cross sectional shape of pit 210*a* were uniformly prepared among all Examples. Herein, these settings of conditions were built on premises that the function generated by the above-discuss arrangement of pits 10*a* provides the friction reducing advantage.

Subsequently, there is discussed the device employed in the experiment.

Figure 16:
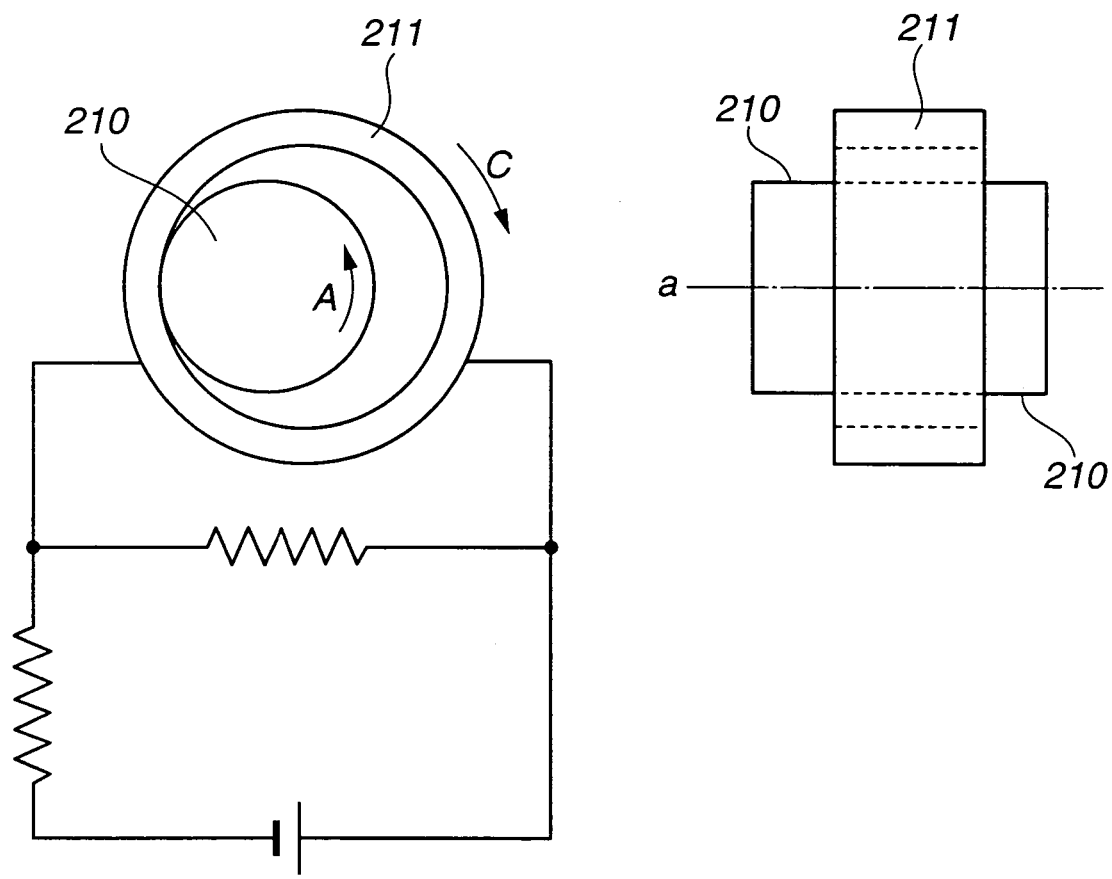
FIG. 16 is a schematic view showing an inscribed two cylinder test machine employed in the second embodiment.

FIG. 16 is a schematic view showing an inscribed two-cylinder contacting test machine employed in the experiments. A sliding device constructed by a shaft and a sliding bearing, which are adapted to a crankshaft of a vehicle engine is generally arranged such that the sliding bearing is fixed and only the shaft is rotated: In order to simulate such a rotating condition of the crankshaft, the test machine was set such that shaft 210 was rotated in the cylinder of the sliding bearing 211 and the sliding bearing 211 was rotated in the inverse direction C of the rotational direction A of shaft 210, and that a relative rotation speed, which is a sum of an absolute value of the rotation speed of column shaft 210 and an absolute value the rotation speed of sliding bearing 211, was set at a rotation speed of the crankshaft. Therefore, an AC servomotor (not shown) was connected to each of column shaft 210 and sliding bearing 211 so that column shaft 210 and sliding bearing 211 were capable of being independently controlled in rotation speed. By soaking column shaft 210 and sliding bearing 211 in oil SAE 5W-30 stored in a not-shown oil bath, oil film was formed between column shaft 210 and sliding bearing 211. A friction torque generated between column shaft 210 and sliding bearing 211 during the relative rotation therebetween, was measured by a torque sensor attached to shaft 210. This arrangement enables the calculation of the friction coefficient between shaft 210 and sliding bearing 211.

Table 3 shows an experiment condition for Examples.

TABLE 3

| Relative rotation speed | 0~12 m/s |
|---|---|
| Mean rolling speed | 0~12 m/s |
| Oil property | SAE 5W-30, API SJ |
| Oil temperature | 80° C. |
| Radial load | 200 N |

A measurable range of the relative rotation speed between column shaft 210 and sliding bearing 211 ranged from 0 to 12 m/s. A range of the mean rolling speed between column shaft 210 and sliding bearing 211 ranged from 0 to 2 m/s. The experiment was carried out under a load condition of radial load of 20 kg, using lubricating oil SAE 5W-30 and API SJ at a temperature of 80° C.

Subsequently, these is discussed a test pattern and an evaluation method of the experiment.

Experiment of each Example was carried out under the two rotation conditions D1 and D2 as shown in Table 2. The rotation speeds of shaft 210 and sliding bearing 211 shown in Table 2 are denoted such that the rotational direction of column shaft 210 is positive. The relative rotation speed between column shaft 210 and sliding bearing 211 was obtained by summing the absolute value of the rotation speed of column shaft 210 and the absolute value of the rotation speed of sliding bearing 211. Under the condition D1, the relative rotation speed was 6 m/s. Under the condition D2, the relative rotation speed was 12 m/s.

The evaluation of friction generated at the sliding surface of each Example was executed on the basis of the friction coefficient obtained by the test machine. Each Example was compared with Comparative Example 3 set as a compared reference. Comparative Example 3 was arranged such that Pits 210*a* thereof had a cross sectional shape shown in FIG. 12D and the oblique angle was 0°. Accordingly, the arrangement of pits 210*a* of Comparative Example 3 was not preferable in view of both of the cross sectional shape of pit 210*a* and the oblique angle. In order to evaluate Examples in view of the cross sectional shape of pit 210*a* and the oblique angle, the friction coefficients of Examples 7 through 14 were compared with that of Comparative Example 3. In Table 2, a ratio obtained by dividing a friction coefficient of each Example by the friction coefficient of Comparative Example 3 is shown.

Subsequently, there is discussed the experimental result.

The experimental result exhibited that the ratio of the friction coefficient of each of Examples 7 through 11 was smaller than that of Comparative Example 5 which has pits 210 of the cross sectional shape shown in FIG. 12E. Therefore, it is concluded that the cross sectional shape shown in FIG. 12A is the most preferable one of the cross sectional shapes shown in FIGS. 12A through 12E in view of reducing the friction.

The ratio of the friction coefficient of each of Examples 12 through 14 was smaller than that of Comparative Example 4 which has pits arranged to have the oblique angle of 70°. Therefore, it is concluded that it is preferable that the oblique angle of the longitudinal direction of pit 210a with respect to the direction perpendicular to the rotational direction of shaft 210 is greater than 0° and smaller than or equal to 60°, and more preferable that the oblique angle is greater than or equal to 30° and is smaller than or equal to 60°.

As to Example 11, the oblique angle and the cross sectional shape of pits 210a were preferably arranged so as to satisfy the above-discussed conditions. Therefore the ratio of the friction coefficient thereof was the smallest one in those of all Examples 7 through 14, and it is concluded that Example 11 is the best one in view of reducing the friction.

Additionally, experiments were carried out under both of the conditions A and B which are different in relative speed. As is apparent from Table 2, the rate of the friction coefficient of each Example 7, 8, 9, 10, 11 decreased as the relative speed increased. That is, the friction decrease effect increased according to the increase of the relative speed. The reason thereof is that the cross sectional shape of pit 210a of each Example 7, 8, 9, 10, 11 was formed into the shape shown in FIG. 12A, and that the function of flowing out lubricating oil due to pit 210a was amplified according to the increase of the relative speed between shaft 210.

Although the embodiment according to the present invention has been shown and described such that pit 210a has a function of promoting the flow of flowing lubricating oil toward the rotational direction of shaft 210, it is not necessary that the function has two functions of feeding (guiding) the flow of lubricating oil toward the rotational direction of shaft 210 and of flowing out the lubricating oil toward the rotational direction, it is not necessary that pit 210a has both functions, and the embodiment may be arranged such that pit 210a has at least one of the above two functions. When pit 210a has been arranged to have both functions as shown in Example 11, the effect of the friction reduction is further effectively obtained.

Pit 210a in the sliding device according to the present invention may be formed on an inner surface of sliding bearing 211. Although the embodiment according to the present invention has been shown and described such that sliding bearing 211 is formed into a cylindrical shape, it may be formed into two half-cylindrical shapes which are releasable therebetween so as to be adapted to a crankshaft.

This application is based on Japanese Patent Applications No. 2004-029829 filed on Feb. 5, 2004, No. 2004-62918 filed on Mar. 5, 2004 and No. 2004-352651 filed on Dec. 6, 2004 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A low-friction sliding device comprising:
   a first sliding member comprising a shaft rotatable about an axis of the first sliding member;
   a second sliding member comprising a sliding bearing slidably supporting the first sliding member through viscous fluid; and
   at least a pit formed on a surface of the shaft;
   wherein a ratio S/L ranges from 0 to 0.3 wherein L is a length of an opening of the pit along a sliding direction of the sliding member comprising the pit, and S is a length from a sliding-directional front-side end of the opening to a bottom of the pit along the sliding direction, and
   wherein the ratio S/L has a value of $0<S/L \leq 0.3$.

2. The sliding device as claimed in claim 1, wherein the ratio S/L has a value of $0<S/L \leq 0.2$.

3. The sliding device as claimed in claim 1, wherein a part of a wall of the pit has a gradient ranging from 0 to 30 degrees with respect to a line perpendicular to a sliding surface of the first sliding member.

4. The sliding device as claimed in claim 3, wherein the wall having the gradient is a wall located at the front side along the sliding direction.

5. The sliding device as claimed in claim 1, wherein the pit has the depth between an end of the opening of the pit along the sliding direction, which is a front side of the pit along the sliding direction, and the bottom of the pit.

6. The sliding device as claimed in claim 1, wherein a cross sectional shape of the pit is one of a right-angled triangle, a rectangle, a W-shape.

7. The sliding device as claimed in claim 1, wherein the opening of the pit comprises a compressed shape which has a long side extending along a direction perpendicular to the sliding direction and a short side extending along the sliding direction.

8. The sliding device as claimed in claim 1, wherein a ratio h/t ranges from 0.04 to 5, wherein t is a deepest depth of the pit and h is a thickness of a film of the viscous fluid formed on the surface comprising the pit.

9. The sliding device as claimed in claim 1, wherein a rate of an occupied area of the pit with respect to the surface of the sliding member comprising the pit ranges from 0.5 to 10%.

10. The sliding device as claimed in claim 1, wherein the sliding members are rotationally sliding portions of an internal combustion engine.

11. A low-friction sliding device comprising:
    a first sliding member comprising a shaft rotatable about an axis of the first sliding member;
    a second sliding member comprising a sliding bearing slidably supporting the first sliding member through viscous fluid; and
    at least a pit formed on a surface of the shaft;
    wherein a ratio S/L ranges from 0 to 0.3 wherein L is a length of an opening of the pit along a sliding direction of the sliding member comprising the pit, and S is a length from a sliding-directional front-side end of the opening to a bottom of the pit along the sliding direction,
    wherein when a hardness of one of the sliding members is different from a hardness of the other sliding member, the pit is formed on the sliding surface of the sliding member having the higher hardness.

12. A low-friction sliding device comprising:
a first sliding member comprising a shaft rotatable about an axis of the first sliding member;
a second sliding member comprising a sliding bearing slidably supporting the first sliding member through viscous fluid; and
at least a pit formed on a surface of the shaft;
wherein a ratio S/L ranges from 0 to 0.3 wherein L is a length of an opening of the pit along a sliding direction of the sliding member comprising the pit, and S is a length from a sliding-directional front-side end of the opening to a bottom of the pit along the sliding direction,
wherein the opening of the pit comprises a compressed shape which has a long side extending along a direction perpendicular to the sliding direction and a short side extending along the sliding direction, and
wherein a length of the short side along the sliding direction ranges from 50 to 150 μm, and a length of the long side along the perpendicular direction is 2 to 10 times the length of the short side.

13. A low-friction sliding device comprising:
a shaft rotatable about an axis of the shaft;
a sliding bearing supporting the shaft through viscous fluid; and
at least a pit formed on an outer surface of the shaft, wherein a surface of the pit forms an aggregation of unit planes, wherein each unit plane has an independent normal, wherein a total area of the unit planes with normals comprising a component in the rotational direction of the shaft is greater than a total area of unit planes with normals comprising a component opposite to the rotational direction of the shaft,
wherein a cross sectional shape, which is obtained by cutting the pit along a plane perpendicular to the axis of the shaft, is a triangle, wherein the pit comprises two side walls, wherein one side wall of the two side walls extends from a bottom point of the triangle.

14. The sliding device as claimed in claim 13, wherein the cross sectional shape is a right-angled triangle.

15. A sliding device comprising:
a shaft rotatable about an axis of the shaft;
a sliding bearing supporting the shaft through viscous fluid; and
at least a pit formed on an outer surface of the shaft, wherein a longitudinal direction of the pit is inclined with respect to a direction perpendicular to a rotational direction of the shaft,
wherein a plurality of pits are arranged to comprise a mirror symmetry with respect to a plane perpendicular to an axis of the shaft.

16. The sliding device as claimed in claim 15, wherein an angle of the longitudinal direction with respect to the direction perpendicular to the rotational direction ranges from 0 to 60°.

17. The sliding device as claimed in claim 15, wherein a plurality of the pits are arranged such that the longitudinal directions of the pits are parallel to each other.

18. The sliding device as claimed in claim 15, wherein the mirror symmetrical arrangement of the pits is repeatedly formed along the axis of the shaft.

19. The sliding device as claimed in claim 15, wherein pits located in one of two zones divided by the plane defining mirror symmetry are arranged such that the longitudinal direction of the pits are parallel with each other.

20. The sliding device as claimed in claim 15, wherein the pits are arranged such that pits provided at far positions apart from the plane are advanced with respect to the rotational direction of the shaft as compared with the pits provided at positions near to the plane.

21. The sliding device as claimed in claim 15, wherein an opening of a pit is formed into a rectangular shape.

22. The sliding device as claimed in claim 15, wherein the total area of openings of pits is greater than 0.3% of the surface area of the shaft and is smaller than or equal to 10% of the surface area.

23. The sliding device as claimed in claim 15, wherein the shaft is a crankshaft.

24. The sliding device as claimed in claim 15, wherein the shaft is a camshaft.

25. The sliding device as claimed in claim 15, wherein the shaft is a part of an internal combustion engine.

26. The sliding device as claimed in claim 25, wherein the engine is a variable compression ratio engine in which a crankshaft and a piston reciprocating in a cylinder are connected through a first connecting rod and a second connecting rod, wherein the first connecting rod and the second connecting rod are connected through a connecting-rod connecting pin, wherein the second connecting rod is swingably connected to a control rod through a control-rod connecting pin, wherein the control rod is connected to a control mechanism through a control-mechanism connecting portion located opposite to the control-rod connecting pin, wherein a stroke length of the piston is controlled by changing a position of the control-mechanism connecting portion by the control mechanism.

27. A sliding device comprising:
a shaft rotatable about an axis of the shaft;
a sliding bearing supporting the shaft through viscous fluid; and
at least a pit formed on an outer surface of the shaft, wherein a longitudinal direction of the pit is inclined with respect to a direction perpendicular to a rotational direction of the shift;
wherein an opening of the pit is formed such that a width dimension perpendicular to the longitudinal direction of the opening ranges from 50 to 150 μm and a longitudinal dimension of the opening is 2 to 10 times the width dimension.

28. A low-friction sliding device comprising:
a first sliding member comprising a shaft rotatable about an axis of the first sliding member;
a second sliding member comprising a sliding bearing slidably supporting the first sliding member through viscous fluid; and
at least a pit formed on a surface of the shaft;
wherein a ratio S/L ranges from 0 to 0.3 wherein L is a length of an opening of the pit along a sliding direction of the sliding member comprising the pit, and S is a length from a sliding-directional front-side end of the opening to a bottom of the pit along the sliding direction, and
wherein the pit includes side walls extending along the sliding direction.

29. A sliding device comprising;
a shaft rotatable about an axis of the shaft;
a sliding bearing supporting the shaft through viscous fluid; and
at least a pit formed on an outer surface of the shaft, wherein a longitudinal direction of the pit is inclined with respect to a direction perpendicular to a rotational direction of the shaft;

wherein the shaft comprises a plurality of pits arranged along a line which is oblique with respect to the direction perpendicular to the rotation direction of the shaft.

30. The sliding device as claimed in claim 29, wherein the line forms an angle with respect to the direction perpendicular to the rotation direction of the shaft, wherein the angle is greater than 0° and not greater than 60°.

* * * * *